United States Patent [19]
Radigan

[11] Patent Number: 6,151,704
[45] Date of Patent: *Nov. 21, 2000

[54] METHOD FOR OPTIMIZING A LOOP IN A COMPUTER PROGRAM BY SPECULATIVELY REMOVING LOADS FROM WITHIN THE LOOP

[75] Inventor: Jim J. Radigan, San Jose, Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/829,980

[22] Filed: Apr. 1, 1997

[51] Int. Cl.⁷ .................................................. G06F 9/45
[52] U.S. Cl. ................................................................ 717/9
[58] Field of Search ..................... 395/705–709, 395/680–685; 712/216; 717/5–9

[56] References Cited

U.S. PATENT DOCUMENTS

| | | | |
|---|---|---|---|
| 4,435,753 | 3/1984 | Rizzi | 364/200 |
| 4,567,574 | 1/1986 | Saadé et al. | 364/900 |
| 4,656,582 | 4/1987 | Chaitin et al. | 364/300 |
| 4,656,583 | 4/1987 | Auslander et al. | 364/300 |
| 4,710,872 | 12/1987 | Scarborough | 364/300 |
| 4,773,007 | 9/1988 | Kanada et al. | 364/300 |
| 4,782,444 | 11/1988 | Munshi et al. | 364/300 |
| 4,802,091 | 1/1989 | Cocke et al. | 364/300 |
| 4,821,181 | 4/1989 | Iwasawa et al. | 364/200 |
| 4,833,606 | 5/1989 | Iwasawa et al. | 364/300 |
| 4,885,684 | 12/1989 | Austin et al. | 364/300 |
| 4,965,724 | 10/1990 | Utsumi et al. | 364/200 |
| 5,202,995 | 4/1993 | O'Brien | 395/700 |
| 5,287,510 | 2/1994 | Hall et al. | 395/709 |
| 5,293,631 | 3/1994 | Rau et al. | 395/700 |
| 5,448,737 | 9/1995 | Burke et al. | 395/709 |
| 5,526,499 | 6/1996 | Bernstein | 712/216 |
| 5,724,536 | 3/1998 | Abramson et al. | 712/216 |
| 5,778,210 | 7/1998 | Henstrom et al. | 712/218 |
| 5,802,337 | 9/1998 | Fielden | 712/216 |
| 5,854,933 | 12/1998 | Chang | 395/709 |
| 5,862,384 | 1/1999 | Hirai | 395/709 |
| 5,966,539 | 10/1999 | Srivastava | 395/709 |
| 6,026,240 | 2/2000 | Subramanian | 395/709 |

OTHER PUBLICATIONS

Koeman et al, "Optimize your code to run faster and jump higher with the Visual C++ 2.0 compiler", microsoft systems Journal, v10,n3, p51(9), Mar. 1995.

McConnell et al, Using Static Single Assignment Form in a Code Optimizer, ACM, v1, n2, pp. 152–160, Jun. 1992.

Brandis, Marc et al, "Single Pass Generation of Static–Assignment Form for Structure Languages", ACM, v16, n6, pp. 1694–1698, Nov. 1994.

Ron Cytron, Jeanne Ferrante, Mark N. Wegman, Barry K. Rosen, and F. Kenneth Zadeck, "An Efficient Method of Computing Static Single Assignment Form", available from the Brown University Department of Computer Science as Technical Report No. CS–88–16 at techreports@cs.brown.edu or through http:/www.cs.brown-.edu:80/techreports/reports/CS–19–21.html, in toto.

(List continued on next page.)

*Primary Examiner*—Majid A. Banankhah
*Assistant Examiner*—P. G. Caldwell
*Attorney, Agent, or Firm*—Blakely, Sokoloff, Taylor & Zafman LLP

[57] ABSTRACT

A method for optimizing a loop in a computer program. The loop contains at least a first statement that uses a variable. The method includes inserting a second statement that loads the variable. The second statement is inserted prior to the loop. The method also includes inserting a third statement that (i) checks whether the variable has been written to at any point between the second statement and the third statement and if and only if the variable has been written to, then loading the variable.

18 Claims, 3 Drawing Sheets

OTHER PUBLICATIONS

Ron Cytron, Jeanne Ferrante, Mark N. Wegman, Barry K. Rosen, and F. Kenneth Zadeck, "Efficiently Computing Static Single Assignment Form and the Control Dependence Graph," 13 ACM Transactions on Programming Languages and Systems (1991); also available from the Brown University Department of Computer Science as Technical Report No. CS–19–21 at techreports@cs.brown.edu or through http:/www.cs.brown.edu:80/techreports/reports/CS–91–21.html, in toto.

Mark N. Wegman and F. Kenneth Zadeck, "Constant Propagation with Conditional Branches," presented at the Twelfth Annual ACM Symposium on Principles of Programming Languages, Sponsored by the Special Interest Group on Automata and Computability Theory and the Special Interest Group on Programming Languages of the Association for Computing Machinery, Jan. 14–16, 1985, in New Orleans, Louisana, available from ACm Press and from the Brown University Department of Computer Science as Technical Report No. CS–91–22 at techreport@cs.brown.edu or through http:/www.cs.brown.edu:80/techreports/reports/CS–91–22.html, in toto.

Kathleen Knobe and Kenneth Zadeck, "Register Allocation Using Control Trees," available from the Brown University Department of Computer Science as Technical Report No. CS–92–13 at techreports@cs.brown.edu and through http:/www.cs.brown.edu:80/techreports/CS–92–13.html, in toto.

Eric Stolz, Harini Srinivasan, James Hook, and Michael Wolfe, "Static Single Assignment Form for Explicitly Parallel Programs: Theory and Practice," available at http:\\www.cse.ogi.edu/Sparse/sparse.papers.html, in toto.

Barry K. Rosen, Mark N. Wegman, and F. Kenneth Zadeck, "Global Value Numbers and Redunant Computations," presented at the Fifteenth Annual ACM Symposium on Principles of Programming Languages, sponsored by the Special Interest Group on Automata and Computability Theory and the Special Interest Group on Programming Languages of the Association for Computing Machinery, Jan. 13–15, 1988, in San Diego, California, available from ACM Press, in toto.

Fred C. Chow and John L. Hennessy, "The Priority–Based Coloring Approach to Register Allocation," 12 ACM Transactions on Programming Languages and Systems 501 (Association for Computing Machinery 1990), in toto.

Gregory J. Chaitin, Marc A. Auslander, Ashok K. Chandra, John Cocke, Martin E. Hopkins, and Peter W. Markstein, "Register Allocation via Coloring," 6 Computer Languages 47 (Pergamon Press Ltd. 1981), in toto.

G. J. Chaitin, "Register Allocation & Spilling via Graph Coloring," Proceedings of the SIGPLAN '82 Symposium on Compiler Construction, presented Jun. 23–25, 1982, in Boston, Massachusetts, sponsored by the Association for Computing Machinery Special Interest Group on Programming Languages (ACM Order No. 548820), in toto.

Vugranam C. Sreedhar, *Efficient Program Analysis Using DJ Graphs*, Ph. D. Thesis, School of Computer Science, McGill University, Quebec Canada (1995), in toto.

Gagan Agrawal, Joel Saltz, and Raja Das, "Interprocedural Partial Redundancy and its Application to Distributed Memory Compilation," UMIACS and Department of Computer Science at the University of Maryland, in toto.

John H. Reif and Harry R. Lewis, "Efficient Symbolic Analysis of Programs," 32 Journal of Computer and System Sciences 280 (Academic Press, Inc. 1986), in toto.

Mark N. Wegman and F Kenneth Zadeck, "Constant Propagation with Conditional Branches," ACM Transactions on Programming Languages 181 (1991), in toto.

Gagan Agrawal and Joel Saltz, "Interprocedural Compilation of Irregular Applications for Distributed Memory Machines," (1995), in toto.

Peter Christy, "IA–64 and Merced–What and Why," 10 Microprocessor Rep. 17 (1996), in toto.

| Sample Code Segment | After Rank 0 Insertion | After Rank-1 Insertion |
|---|---|---|
| Loop {. . .<br>　　*p = 4<br>　　y = a[x]+b<br>　　. . . } | $t_1$ = ld.a(x)<br>Loop {. . .<br>　　*p = 4<br>　　$t_1$ = ld.c(x)<br>　　y = a[$t_1$]+b | $t_1$ = ld.a(x)<br>$t_2$ = ld.a(a[$t_1$])<br>Loop {. . .<br>　　*p = 4<br>　　$t_1$ = check.a(x, handler)<br>　　$t_2$ = ld.c(a[$t_1$])<br>　　Label1:<br>　　y = $t_2$+b<br>　　. . .} |

Figure 3

METHOD FOR OPTIMIZING A LOOP IN A COMPUTER PROGRAM BY SPECULATIVELY REMOVING LOADS FROM WITHIN THE LOOP

RELATED APPLICATIONS

The invention disclosed and claimed herein is related to the following patents:

(1) U.S. Pat. No. 5,999,735, entitled "A Method for Constructing a Static Single Assignment Language Accommodating Arbitrarily Complex Symbolic Memory References";

(2) U.S. Pat. No. 6,002,879, entitled "A Method for Performing Common Subexpression Elimination on a Rank-n Static Single Assignment Language";

(3) U.S. Pat. No. 6,016,398, entitled "A Method of Using Static Single Assignment to Color Out Artificial Register Dependencies";

(4) U.S. Pat. No. 5,991,540, entitled "A Method for Identifying Partial Redundancies in Existing Processor Architectures"

(5) U.S. Pat. No. 6,029,005, entitled "A Method for Identifying Partial Redundancies in a New Processor Architecture"; and (6) U.S. Pat. No. 6,031,994, entitled "A Method for Determining the Set of Variables that May Be Ambiguously Defined at a Point in a Computer Program".

These applications are hereby expressly incorporated by reference for all permissible purposes as if expressly set forth verbatim herein.

BACKGROUND OF THE INVENTION

Field of the Invention

The invention relates to a computer implemented method optimizing a loop in a computer program. The method enables optimizing compilers to efficiently implement a code improving transformation that removes load statements from certain loops. This method may be performed upon rank-n static single assignment ("SSA") intermediate languages.

Most computer programmers write computer programs in source code using high-level languages such as C, FORTRAN, or PASCAL. While programmers may easily understand such languages, modern computers are not able to directly read such languages. Thus, such computer programs must be translated into a language, known as machine language, that a computer can understand. One step in the translating process is performed by a compiler. A compiler is a computer program that translates a source code program into object code. Object code is a machine language description of a high-level computer program. Object code produced by straight forward compiling algorithms can often be made to execute faster. This improvement is called optimization. Compilers that apply code-improving transformations are called optimizing compilers.

Some conventional optimizing compilers translate high-level computer programs into an intermediate language known as a Static Single Assignment (SSA) representation. This SSA intermediate language is used as a basis to perform certain optimizations. After these optimizations are performed, these conventional compilers translate the SSA intermediate language into optimized object code.

A statement in a computer program is said to "define" a variable if it assigns, or may assign, a value to that variable. For example, the statement "x=y+z" is said to "define" x. A statement that defines a variable contains a "definition" of that variable. In this context, there are two types of variable definitions: unambiguous definitions and ambiguous definitions. Ambiguous definitions may also be called complex definitions.

When a definition always defines the same variable, the definition is said to be an "unambiguous definition" of that variable. For example, the statement, "x=y" always assigns the value of y to x. Such a statement always defines the variable x with the value of y. Thus, the statement "x=y" is an "unambiguous definition" of x. If all definitions of a variable in a particular segment of code are unambiguous definitions, then the variable is known as an unambiguous variable.

Some definitions do not always define the same variable. However, these definitions may possibly define different variables at different times in a computer program. Thus, they are called "ambiguous definitions." There are many types of ambiguous definitions and the principal common denominator among the many types is that they are not unambiguous definitions. One type of "ambiguous definition" occurs where a pointer refers to a variable. For example, the statement "*p=y" may be a definition of x since it is possible that the pointer p points to x. Thus, the above ambiguous definition may ambiguously define any variable x if it is possible that p points to x. In other words, *p may define one of several variables depending on the value of p. Another type of ambiguous definition is a call of a procedure with a variable passed by reference. When a variable is passed by reference, the address of the variable is passed to the procedure. Passing a variable by reference to a procedure allows the procedure to modify the variable. Alternatively, variables may be passed by value. When a variable is passed by value, only the value of the variable is passed to'the procedure. Passing a variable by value does not allow the procedure to modify the variable. Still another type of ambiguous definition is a procedure that may access a variable because that variable is within the scope of the procedure. Another type of ambiguous definition occurs when a variable is not within the scope of a procedure but the variable has been identified with another variable that is passed as a parameter or is within the scope of the procedure.

When a statement in a computer program references a variable, the statement is said to "use" the variable. For example, the statement "x=y+z" refers to and is said to "use" y and z. Similarly, y and z (but not x) are "used" in the statement "x[y]=z." A statement that uses a variable contains a "use" of that variable.

A definition of a variable "reaches" a use of that variable if that definition is the last ambiguous or definite definition of that variable prior to the use. Consider the following straight-line C pseudo code.

x=6
x=x+5
x=7
x=x+8

The definition in the first statement "x=6" reaches the use in the second statement "x=x+5." Similarly, the definition in the third statement "x=7" reaches the use in the fourth statement "x=x+8." Note that the definition in the first statement does not reach the use of the fourth statement because x is redefined in the second and third statements.

In the above example, the definitions of x in the second and third statements are said to "kill" the definition of x in the first statement in that they nullify the effects of the definition in the first statement. Only unambiguous definitions of a variable can kill other definitions of the variable. Thus, a use can be reached by both an unambiguous definition and a subsequent ambiguous definition of the same variable.

A computer programmer may address a variable by specifying the variable's location in memory. This location is known as the variable's absolute address. This method of addressing is known as direct addressing. Direct addressing commonly occurs when a variable is specified by its name. For example, in the statement "y=x," both y and x are directly addressed.

A computer programmer may also address a variable by specifying an address that refers to a different address, which may specify yet another address. This method of addressing is known as indirect addressing. Common examples of indirect addressing include pointers, arrays and combinations of pointers and arrays. Examples of indirect addressing include a[i], *p, *(p+4), **p, a[b[i]], and *(*p+4). When a variable is indirectly addressed, at least one indirect memory reference is employed to determine the absolute address of the variable.

A variable may be classified based upon the number of indirect memory references employed to determine the absolute address of the variable. For example, as discussed above, y and x may be directly addressed. Thus, there are zero indirect memory references employed to determine the absolute address of both y and x. These variables are known as rank-0 variables.

A variable that requires a single indirect memory reference is known as a rank-1 variable. Examples of rank-1 variables include single pointer references and single array references such as a[i], *p, and *(p+4). A variable that requires two indirect memory references is known as a rank-2 variable. Rank-2 variables include double pointer references and double array references and the combination of a single pointer reference and a single array reference. Examples of rank-2 variables include **p, a[b[i]], and *(*p+4). A rank-n variable employs n indirect memory references to determine the absolute address of the variable.

A definition that defines a rank-n variable is known as a rank-n definition. Similarly a use of a rank-n variable is known as a rank-n use. For example, the definition of the array element b[a[i]] is a rank-0 use of the variable i, a rank-1 use of the array element a[i], and a rank-2 definition of the array element b[a[i]].

Returning to the discussion of SSA intermediate languages, when a computer program is conventionally translated into a SSA intermediate language, each variable definition is given a unique name. Further, all the uses reached by that definition are also renamed to match the variable's new name. For example, consider the straight-line C pseudo code discussed above. When this C pseudo code is translated into a SSA intermediate language, the result would be the following:

$t_1=6$
$t_2=t_1+5$
$t_3=7$
$t_4=t_3+8$

The symbols $t_1$ through $t_4$ represent compiler temporaries or even more commonly as temps. Unlike most variables, temps have only a single definition. Because a temp has only a single definition, it may not be defined by an ambiguous definition. Thus, temps are unaliasable scalars. Because temps are unaliasable scalars, an expression using $t_1$ has a different symbolic meaning from the symbolic meaning of an otherwise identical expression using i. Every use of i cannot be considered equal because i represents an aliasable variable. However, every use of $t_1$ can be considered equal. While a compiler may not be able to determine the value contained in a temp, every use of that temp will return the same unknown value. Therefore, temps dramatically simplify certain compiler algorithms.

Unlike the above straight-line C pseudo code, programs typically also contain branch statements. A branch statement is a statement that selects one set of statements from a number of alternative sets of statements. For example, consider the following if-then-else statement:

if (p) then
 {x=4}
else
 {x=6}
x=2+x

The flow of control through this code segment during execution will branch depending on whether p is true or false and will unite again at the statement "x=2+x." The point where the flow of control branches is known as the "branch point" and the point where it unites is known as the "join point" or the "confluence point."

When this C pseudo code is translated into a SSA intermediate language, the result would be the following:

if (p) then
 {$t_1=4$}
else
 {$t_2=6$}
$t_3=\Phi(t_1, t_2)$
$t_4=2+t_3$

Depending on the value of p, either $t_1$ will be defined as 4 or $t_2$ will be defined as 6. In order to "join" these two definitions, a special definition called a phi-function is inserted at the "join point" where the branches join. Phi-functions are known by those skilled in the art.

The above phi-function contains two operands. An operand is a quantity that enters into (or results from) an operation. The operands indicate which definitions reach the join point. In this example, both $t_1$ and $t_2$ reach the join point. Thus, both $t_1$ and $t_2$ are operands to the phi-function that defines $t_3$. As shown above, subsequent uses of x in the original program would use $t_3$ in the corresponding SSA intermediate language.

One or more of the above-listed related application Ser. No. 08/831,074, filed on even date herewith, describe a method of creating a rank-n SSA intermediate language from a rank-(n-1) SSA intermediate language, where n is a positive integer. The method includes searching the rank-(n−1) SSA intermediate language for rank-1 definitions that reach at least one use and renaming the rank-1 definitions and the at least one use. By repetitively performing this method, increasingly more complex symbolic expressions may be incorporated into a SSA intermediate language. A rank-n SSA intermediate language provides a uniquely simple framework for performing many manipulations and optimizations such as those described in the U.S. patent applications incorporation by reference above.

A widely held belief is that a computer program spends ninety percent of its execution time in ten percent of the program. While the actual percentages may vary, it is often the case that a small fraction of a computer program accounts for most of the execution time. A computer program often spends a large percentage of its time executing loops. A loop is a sequence of statements that is to be executed iteratively. Some modem structured languages have looping control constructs such as "while," "repeat,"

"goto," and "for" statements. Thus, these loops may be easily determined from the syntax of the program.

A loop typically has one entry point and one exit point. However, it may have several entry points and several exit points. An entry point is a statement in a loop. The only way to reach a statement in a loop is to first execute an entry point. An exit point is also a statement in a loop. The only way to reach a statement outside the loop from inside the loop is to go through an exit point. An exit point is the last statement executed in a loop.

Variables in high-level languages are an abstraction of memory locations. One of the compiler's tasks when translating a high-level computer language program into object code is to assign these abstract variables into physical locations.

An optimizing compiler that utilizes a SSA intermediate language typically attempts to assign as many variables as possible to temps. Because temps may be placed in registers, numerous loads and stores to/from external memory may often be eliminated. However, not all variables may be assigned to temps. In some circumstances a variable may be assigned to a location within external memory. The method that a compiler utilizes to assign variables to registers and memory locations in part determines the execution time of a computer program.

One conventional method of assigning variables to registers is to assign as many variables to registers as possible and then assign any remaining variables to external memory. Another method of assigning variables is to assign registers to the variables that have the greatest utilization and then assign any remaining variables to external memory. As was discussed above, variables within loops are often the most utilized variables. Consider the following loop that contains only unambiguous definitions.

Loop { . . .
   y=x+a
   . . . }

A conventional optimizing compiler that utilizes a SSA intermediate language may optimize the above loop as follows.

$t_1$=x;
Loop { . . .
   y=$t_1$+a
   . . . }

In this loop, $t_1$ would optimally be assigned to a register. Thus, the definition of $t_1$ would load the variable x from external memory into the register assigned to $t_1$. Note that the load of x is now outside of the loop. This optimization minimizes the number of loads from external memory and reduces the execution time of the loop.

As shown above, it is often optimal to move load instructions outside of a loop. However, utilizing conventional methods, it is not always possible to move such instructions outside of a loop. Consider the following C pseudo code loop.

Loop { . . .
   *p=4
   y=x+a
   . . . }

The ambiguous definition of *p may modify the value of x. Thus, the variable x must be reloaded in subsequent instructions such as the instruction that defines y. As a result, conventional SSA compilers cannot assign the variable x to a temp outside the loop as discussed above. The resulting loop is not optimal. Thus, a need exists for a method to optimize a loop that contains an ambiguous definition prior to a use of a variable.

SUMMARY OF THE INVENTION

A method for optimizing a loop in a computer program, the loop containing at least a first statement that uses a variable. The method includes inserting a second statement that loads the variable outside and prior to the loop. The method also includes inserting a third statement that checks whether the variable has been written to at any point between the second statement and the third statement. If, and only if, the variable has been written to, then the third statement loads the variable.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings:

FIG. 3 are tables illustrating code transformations on a sample code segment employing the embodiment of FIG. 2.

DETAILED DESCRIPTION OF PARTICULAR EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

A loop that contains an ambiguous definition prior to statement that uses a rank-0 variable is shown below:

Loop { . . .
   *p=4
   y=x+a
   . . . }

Figure 1:
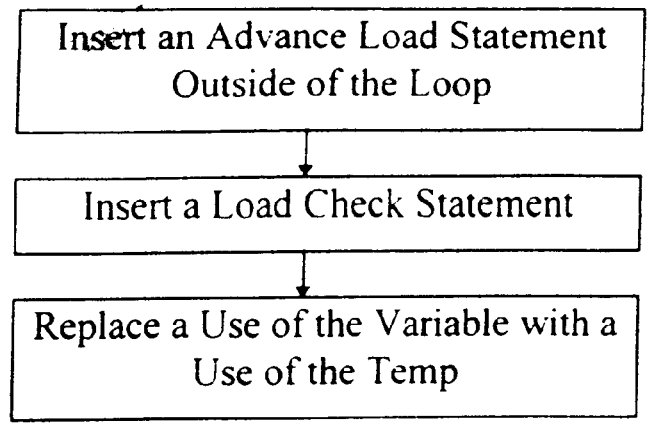
FIG. 1 is a flow diagram of one embodiment of a method for optimizing a computer program in accordance with the invention.

As noted above, the ambiguity introduced by *p prevents loop optimization in conventional compilers. FIG. 1 presents one embodiment of a method to optimize the above loop in accord with the present invention.

Referring to FIG. 1, the compiler first inserts a statement that defines a temp with the value of the rank-0 variable x. Because temps are typically associated with registers, the statement typically loads the value of x into a register. As shown below, the statement is inserted at a point that is outside of the loop. Typically, the statement is inserted just prior to the entry point of the loop, i.e., in the loop header.

Because this statement loads x prior to the statement that actually uses x, the statement will be referred to as an advance load statement.

Referring again to FIG. 1, the compiler next inserts a load check ("ld.c") statement. The load check statement is typically inserted just prior to the statement that uses the variable x. The load check statement first checks whether the variable x has been written to at any point between the advance load and load check statements. With recent advances in microprocessor design, it is possible to rapidly perform such a check. In fact, such a check may be performed in less than a single clock cycle. Thus, if x has not been written to, then the load check statement carries a zero cycle delay.

If and only if the variable x has been written to at a point between the advance load and the load check statements, then x is reloaded from memory. The temp is then defined with the reloaded value of x. Because the temp was defined with the reloaded value of x, the temp is defined with the value of x just prior to the load check statement.

Referring again to FIG. 1, the compiler next replaces the use of the variable x with a use of the temp.

If the method presented in FIG. 1 is applied to the unoptimized loop presented above, then the following optimized loop would result:

$t_1$=ld.a(x)
Loop { ...
  *p=4
  $t_1$=ld.c(x)
  y=$t_1$+a
  ... }

Note that the definition of $t_1$ is outside of the loop such that, if the ambiguous definition of *p does not write to the memory address of x, then no memory loads of x will occur in the loop. Since such an overwrite will rarely occur and since this check can now be carried out with zero cycles, the execution time of the loop will be decreased.

In one embodiment of the invention, the advance load and load check statements are inserted during the construction of a rank-0 SSA intermediate language. Thus, the statements would be inserted into a rank-0 SSA intermediate language. In another embodiment of the invention, the statements would be inserted during the construction of a rank-1 SSA intermediate language. Thus, the statements would be inserted into a rank-1 SSA intermediate language. In still another embodiment of the invention, the statements would be inserted during the construction of a rank-2 SSA intermediate language. Thus, the advance load statement would be inserted into a rank-2 SSA intermediate language.

In embodiments wherein the intermediate language contains expressions of rank-1 or higher, the load check statements may preferably contain an operand pointing to a handler routine. The handler routine would include one or more statements that would be executed if the address of x has been written to at a point between the advance load and load check statements. For example, a handler operand for the above load check statement might point to a statement that reloads x and then defines $t_1$ with the reloaded value of x. Although this type of load check statement is preferably inserted when the loop contains an expression of rank-1 or higher, it may also be used in rank-0 SSA intermediate languages. This load check statement ("check.a") containing an operand pointing to a handler would load the variable only if written to by calling the handler routine. The handler routine would then reload with the same value that was advance loaded before entering the loop.

For example, a loop that contains an ambiguous definition prior to a statement that uses a rank-1 variable is shown below:

Loop { ...
  *p=4
  y=a[x]+b
  ... }

Figure 2:
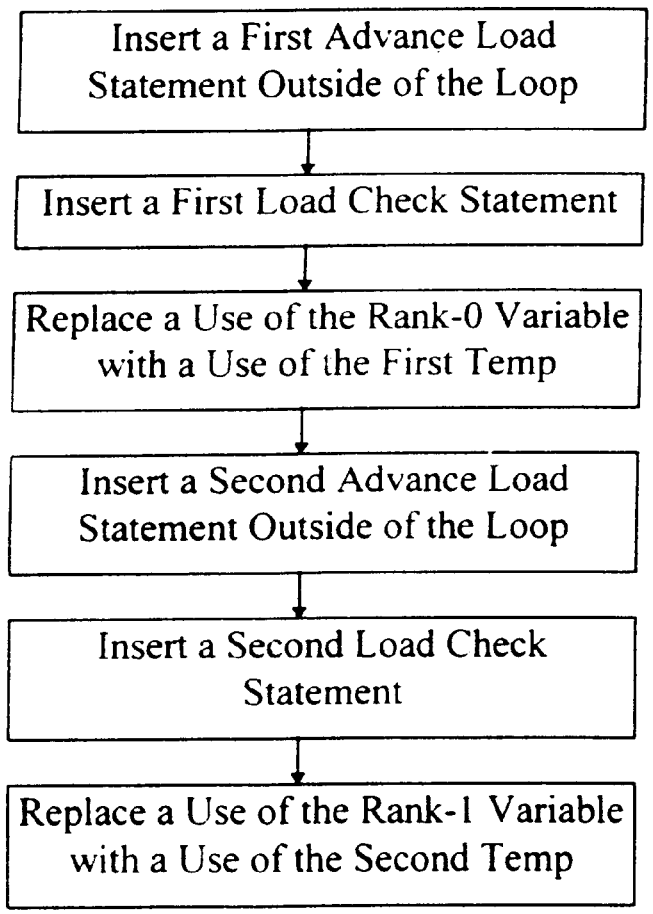
FIG. 2 is a flow diagram of another embodiment of a method of optimizing a computer program in accordance with the invention.

FIG. 2 presents one embodiment of a method to optimize the above loop in accordance with the present invention. Note that the rank-1 variable a[x] contains a use of the rank-0 variable x. FIG. 3 is a table illustrating code transformations employing the embodiment of FIG. 2. Referring to FIG. 2, the compiler first inserts a statement that defines a temp with the rank-0 variable x. This statement will be referred to as a first advance load statement ("ld.a"). Similarly, the temp will be referred to as a first temp. Because temps are typically associated with registers, the first advance load statement typically loads the value of x into a register. As shown below, the first advance load statement is inserted at a point that is outside of the loop. Typically, the first advance load statement is inserted just prior to the entry point of the loop, i.e., in the loop header.

Referring again to FIG. 2, the compiler next inserts a first load check statement ("check.a") containing an operand and a pointer to a handler routine. The first load check statement is typically inserted just prior to the statement that uses the variable a[x]. The first load check statement checks whether the variable x has been written to at any point between the first advance load statement and the first load check statement. If and only if the variable x has been written to at a point between the first advance load statement and the first load check statement, then x is reloaded from memory. More particularly, the handler routine is called whereupon the first temp is then defined with the advance-loaded value of x.

Referring again to FIG. 2, the compiler next replaces the use of the variable x with a use of the first temp. After this replacement, the partially optimized loop would include the following statements:

$t_1$=ld.a(x)
Loop { ...
  *p=4
  $t_1$=check.a(x, handler)
  y=a[$t_1$]+b
  ... }

Referring again to FIG. 2, the compiler next inserts a statement that defines a temp with the value of the rank-1 variable a[$t_1$]. This statement will be referred to as a second advance load statement ("ld.a"). Similarly, the temp will be referred to as a second temp. Because temps are typically associated with registers, the second load check statement typically loads the value of a[$t_1$] into a register. The second advance load statement is inserted at a point that is outside of the loop. Typically, the advance load statement is inserted between the first advance load statement and the entry point of the loop.

Referring again to FIG. 2, the compiler next inserts a second load check statement ("ld.c"). The second load check statement is typically inserted between the first load check statement and the statement that uses the variable a[$t_1$]. The second load check statement first checks whether the variable a[$t_1$] has been written to at any point between the second advance load statement and the second load check statement. If and only if the variable a[$t_1$] has been written to at a point between the second advance load statement and the second load check statement, then a[$t_1$] is reloaded from memory. The second temp is then defined with the reloaded value of a[$t_1$]. Because the second temp was defined with the reloaded value of a[$t_1$], the second temp is defined with the value of a[$t_1$] just prior to the second load check statement.

Referring again to FIG. 2, the compiler next replaces the use of the variable a[$t_1$] with a use of the second temp.

If the method presented in FIG. 2 is applied to the unoptimized loop previously presented then the following optimized loop will result:

$t_1 = ld.a(x)$ $t_2 = ld.a(a[t_1])$

Loop { . . .

*p=4

$t_1 = check.a(x, handler)$ $t_2 = ld.c(a[t_1])$

Label1:

$y = t_2 + b$

. . . } handler routine:

$t_1 = ld.a(x)$ $t_2 = ld.a(a[t_1])$ goto Label1

Note that the definition of $t_2$ is outside of the loop. Thus, if the ambiguous definition of *p does not write to the memory address of x or $a[t_1]$ then no memory loads of $a[t_1]$ will occur in the loop. By removing such memory loads, the execution time of the loop will be decreased.

As noted earlier, recent advances in microprocessor design enable load checks such as those described above to be performed in less than a single clock cycle. If the variable that was advance loaded has not been written to, the instruction effectively carries a zero cycle delay. For instance:

cycle 1: lda(x)

cycle 2:

cycle 3: ldc(x) use(x)

If the variable x in the above example has not been written to between the advanced load ("ld.a") and the load check ("ld.c"), which is the case most of the time, then there is a zero cycle wait between the load check and the use of x. The load check consequently is effectively not an operation, the load is effectively removed outside the loop, and loop invariant motion is effectively eliminated. Hence, the savings in execution time in the loop.

Still other alternative embodiments are possible or even desirable. For example, ambiguous constant propagation may be employed as is disclosed and claimed in U.S. Pat. No. 6,031,994 entitled "A Method for Determining the Set of Variables that May Be Ambiguously Defined at a Point in a Computer Program." Alternative embodiments may also include, for instance:

(1) identifying and eliminating partial redundancies while constructing the final intermediate language representation such as, for example, is set forth in U.S. Pat. No. 5,991,540 entitled "A Method for Identifying Partial Redundancies in Existing Processor Architectures" and in U.S. Pat. No. 6,029,065 entitled "A Method for Identifying Partial Redundancies in a New Processor Architecture;"

(2) coloring out artificial register dependencies such as, for example, is set forth in U.S. Pat. No. 6,016,398, entitled "A Method of Using Static Single Assignment to Color Out Artificial Register Dependencies;" and (3) eliminating common subexpressions such as, for example, is set forth in U.S. Pat. No. 6,002,879 entitled "A Method for Performing Common Subexpression Elimination as a Rank-n Static Single Assignment Language."

Figure 4:
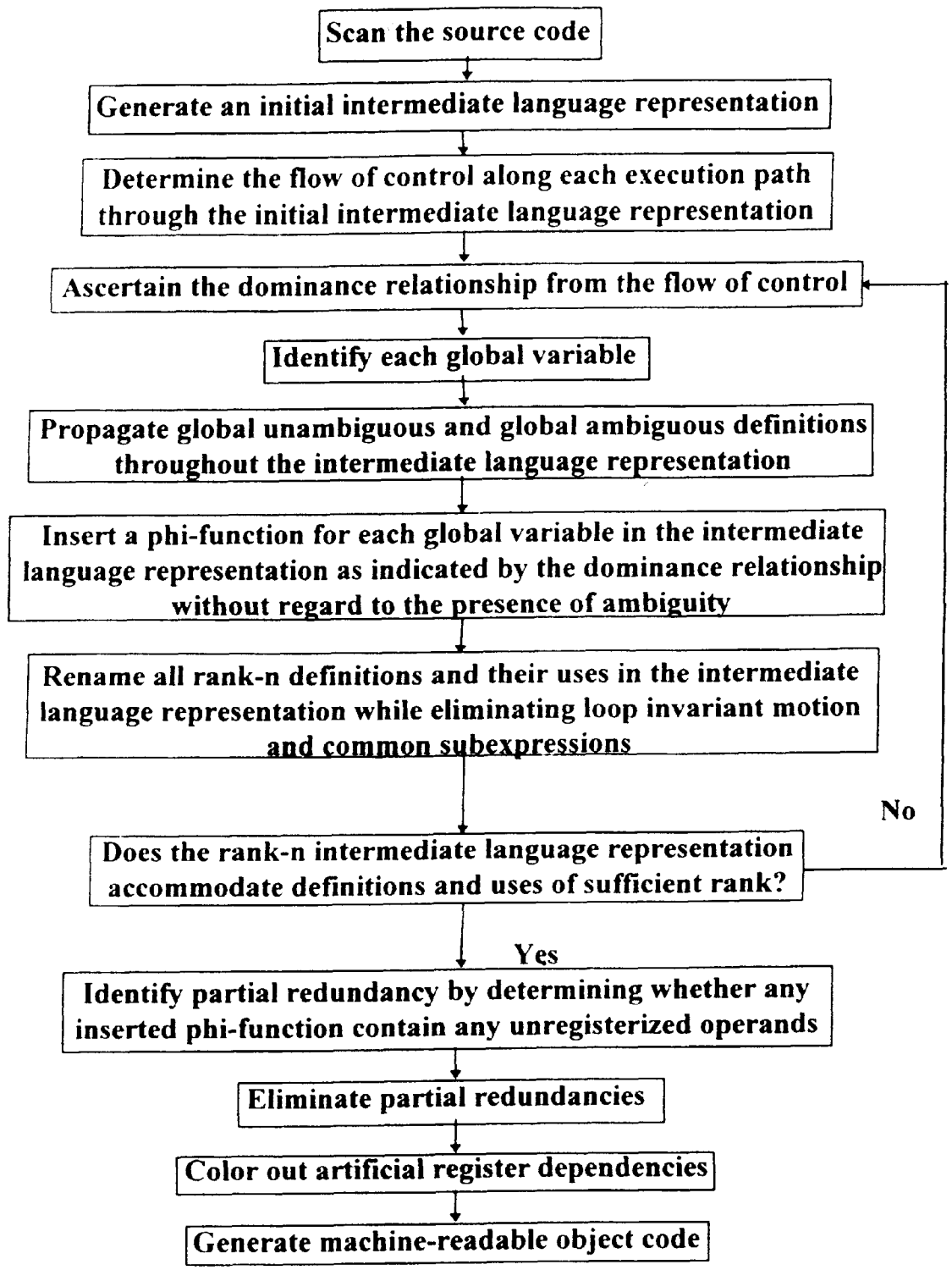
FIG. 4 is a flow diagram of another embodiment of a method of optimizing a computer program.

Each of these applications was previously incorporated by reference. Indeed, one alternative embodiment of the present invention incorporates all the variations discussed above as set forth in FIG. 4. Eliminating loop invariant motion in the embodiment of FIG. 4 occurs during the renaming phase of constructing a rank-n SSA intermediate language. More particularly, the embodiment of FIG. 4 proceeds to rename definitions and their subsequent uses and, upon encountering a loop-invariant load, moves it outside the loop using the advanced load ("ld.a") and load check ("ld.c" or "check.a" as appropriate) in the manner discussed above for the embodiments of FIGS. 1–3.

Any of the foregoing methods may be implemented by programming a suitable general purpose computer. The programming may be accomplished through the use of a program storage device readable by the general purpose computer and encoding a program of statements executable by the computer for performing the operations described above. The program storage device may take the form of, e.g., one or more floppy disks, a hard disk, a CD ROM or other optical or magnetic-optical disk, a magnetic tape, a read-only memory chip (ROM), and other forms of the kind well-known in the art or subsequently developed. The program of statements may be source code or object code, or a high-level language, or in some intermediate form such as partially compiled code. The precise forms of the program storage device and of the encoding of statements are immaterial.

A primary advantage of the above described method is that it significantly increases the performance of loops with ambiguous definitions. By moving loads outside of such loops, memory access is reduced and execution time is decreased.

Another advantage of the above described methods is that the size of a compiler utilizing such a method is decreased. This decrease in compiler size results in a decrease in compiler system maintenance, results in a decreased time to market, and decreases compile time. Further, by decreasing the compiler size, the compiler may be executed on less sophisticated computer hardware than conventional compilers.

Another advantage of the above described methods is that they preserve the meaning of computer programs. That is, the methods do not change the output produced by a program for a given input or cause an error that was not present in the original version of the computer program. Thus, the methods are "safe" methods.

It will be appreciated by those of ordinary skill having the benefit of this disclosure that the illustrative embodiments described above are capable of numerous variations without departing from the scope and spirit of the invention. While the methods are presented utilizing C pseudo code, the methods are not limited to C. The methods may be performed on any computer program such as C++, FORTRAN, COBOL, PASCAL, etc. Furthermore, the methods may by performed on a computer program written or stored in object code or machine language. Still further, the methods may be performed on a computer program stored in an intermediate compiler language that may be utilized to perform other optimizations prior to translation to object code. In addition, while the sequence of acts are presented in a specific order, the order of the acts may be modified.

Accordingly, the exclusive rights sought to be patented are as described in the claims below.

What is claimed is:

1. A method of optimizing a loop in a computer program, the method comprising:

(a) inserting an advance load statement that defines a temp with the value of a variable, the advance loading statement being inserted outside the loop;

(b) inserting a load check statement in the loop, the load check statement configured to (i) check whether the variable has been written to at any point between the advance load statement and the load check statement; and (ii) if the variable has been written to, define the temp with a current value of the variable; and (c) replacing a statement that occurs in the loop and that uses the variable with a statement that uses the temp.

2. The method of claim 1, wherein the act of inserting the advance load statement includes inserting the advance load statement into a rank-0 SSA intermediate language.

3. The method of claim 1, wherein the act of inserting the advance load statement includes inserting the advance load statement into a rank-n SSA intermediate language, where n is greater than 0.

4. The method of claim 1, wherein the act of replacing the statement includes replacing a statement that occurs at a point after a prior statement in the loop that includes an ambiguous definition.

5. The method of claim 1, where in the act of inserting a load check statement includes inserting a load check statement that includes an operand that point s to a handler routine.

6. A method of optimizing a loop in a computer program, the loop containing a first statement that uses a rank-1 variable, the rank-1 variable containing a use of a rank-0 variable, the method comprising:

inserting a first advance load statement that defines a first temp with the value of the rank-0 variable, the first advance load statement being inserted outside of the loop;

inserting a second advance load statement that defines a second temp with the value of rank-1 variable, the second advance load statement being inserted outside of the loop;

inserting a first load check statement, the first load check statement configured to check whether the rank-0 variable has been written to at any point between the first advance load statement and the first load check statements and if the rank-0 variable has been written to, then redefine the first temp with a current value of the rank-0 variable and redefines said second temp with a current value of the rank-1 variable;

inserting a second load check statement, the second load check statement configured to check whether the rank-1 variable has been written to at any point between the second advance load statement and the second load check statement and if the rank-1 variable has been written to, redefine the second temp with a current value of the rank-1 variable; and replacing the first statement with a second statement that uses the second temp.

7. The method of claim 6, wherein the act of inserting the first advance load statement includes inserting the first advance load statement into a rank-1 SSA intermediate language.

8. The method of claim 6, wherein the act of inserting the second advance load statement includes inserting the second advance load statement into a rank-2 SSA intermediate language.

9. A computer readable medium, said computer readable medium containing a set of instructions for compiling a program loop in a computer program, which when executed by a computer processor, cause the processor to:

(a) insert an advance load statement that defines a temp with the value of a variable, the advance loading statement being inserted outside the loop;

(b) insert a load check statement in the loop, the load check statement configured to (i) check whether the variable has been written to at any point between the advance load statement and the load check statement, and (ii) if the variable has been written to, define the temp with a current value of the variable; and (c) replace a statement that occurs in the loop and that uses the variable with a statement that uses the temp.

10. The computer readable medium of claim 9, wherein the sequences of instructions further cause the processor to insert the advance load statement into a rank-0 SSA intermediate language.

11. The computer readable medium of claim 9, wherein the sequences of instructions further cause the processor to insert the advance load statement into a rank-n SSA intermediate language, wherein n is greater than 0.

12. The computer readable medium of claim 9, wherein the sequences of instructions further cause the processor to replace a statement that occurs at a point after a prior statement in a loop that includes an ambiguous definition.

13. The computer readable medium of claim 9, wherein the sequences of instructions further cause the processor to insert a load check statement that includes an operand that points to a handler routine.

14. A computer system for optimizing a loop in a computer program comprising:

a processor; and one or more storage devices, the storage devices having stored thereon sequences of instruction that when executed by the processor, cause the processor to, (a) insert an advance load statement that defines a temp with the value of a variable, the advance loading statement being inserted outside the loop, (b) insert a load check statement in the loop, the load check statement configured to (i) check whether the variable has been written to at any point between the advance load statement and the load check statement, and (ii) if the variable has been written to, then define the temp with a current value of the variable, and (c) replace a statement that occurs in the loop and that uses the variable with a statement that uses the temp.

15. The computer system of claim 14, wherein the sequences of instructions stored on the one or more storage devices further cause the processor to insert the advance load statement into a rank-0 SSA intermediate language.

16. The computer system of claim 14, wherein the sequences of instructions stored on the one or more storage devices further cause the processor to insert the advance load statement into a rank-n SSA intermediate language, wherein n is greater than 0.

17. The computer system of claim 14, wherein the sequences of instructions stored on the one or more storage devices further cause the processor to replace a statement that occurs at a point after a prior statement in a loop that includes an ambiguous definition.

18. The computer system of claim 14, wherein the sequences of instructions stored on the one or more storage devices further cause the processor to insert a load check statement that includes an operand that points to a handler routine.

* * * * *

UNITED STATES PATENT AND TRADEMARK OFFICE
CERTIFICATE OF CORRECTION

PATENT NO. : 6,151,704
DATED : November 21, 2000
INVENTOR(S) : Radigan

It is certified that error appears in the above-identified patent and that said Letters Patent is hereby corrected as shown below:

Column 1,
Line 29, delete "applications" and insert -- patents --.

Column 9,
Line 52, delete "6,029,065" and insert -- 6,029,005 --.

Signed and Sealed this

Sixteenth Day of July, 2002

Attest:

Attesting Officer

JAMES E. ROGAN
Director of the United States Patent and Trademark Office